(12) United States Patent
Yamada et al.

(10) Patent No.: US 12,540,812 B2
(45) Date of Patent: Feb. 3, 2026

(54) LASER INTERFEROMETER

(71) Applicant: SEIKO EPSON CORPORATION, Tokyo (JP)

(72) Inventors: Kohei Yamada, Shiojiri (JP); Atsushi Matsuo, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 239 days.

(21) Appl. No.: 18/522,316

(22) Filed: Nov. 29, 2023

(65) Prior Publication Data

US 2024/0175674 A1 May 30, 2024

(30) Foreign Application Priority Data

Nov. 30, 2022 (JP) ................................. 2022-191189

(51) Int. Cl.
*G01B 9/02* (2022.01)
*G01B 9/02002* (2022.01)

(52) U.S. Cl.
CPC ..... *G01B 9/02083* (2013.01); *G01B 9/02002* (2013.01); *G01B 9/02045* (2013.01); *G01B 2290/70* (2013.01)

(58) Field of Classification Search
CPC .............. G01B 9/0201; G01B 9/02045; G01B 9/02083; G02F 1/11; G02F 2/00; G01H 9/00; G01P 3/363; G01P 3/366
See application file for complete search history.

(56) References Cited

U.S. PATENT DOCUMENTS

| | | | |
|---|---|---|---|
| 6,381,015 B1 * | 4/2002 | Sonehara | G01N 21/45 356/497 |
| 2004/0150832 A1 * | 8/2004 | Mermelstein | G01B 9/02014 356/497 |
| 2020/0309953 A1 | 10/2020 | Yamada | |
| 2022/0065614 A1 | 3/2022 | Yamada et al. | |
| 2022/0276098 A1 * | 9/2022 | Yamada | G01J 9/02 |

(Continued)

FOREIGN PATENT DOCUMENTS

| CN | 115406481 A | 11/2022 |
|---|---|---|
| JP | H02-038889 A | 2/1990 |

(Continued)

*Primary Examiner* — Michael A Lyons
(74) *Attorney, Agent, or Firm* — Harness, Dickey & Pierce, P.L.C.

(57) ABSTRACT

A laser interferometer includes: a laser light source configured to emit laser light toward an object; an optical modulator including a vibrator configured to modulate the laser light using the vibrator and superimpose a modulation signal on the laser light; a photodetector configured to receive the laser light including a sample signal derived from the object and the modulation signal, and to output a light reception signal; a demodulation circuit configured to demodulate the sample signal from the light reception signal based on a reference signal; and an oscillation circuit configured to operate using the vibrator as a signal source and output the reference signal to the demodulation circuit. The vibrator includes a vibration substrate having a base portion and a vibration unit coupled to the base portion. The vibration unit vibrates along an in-plane direction of the vibration substrate and includes a side surface intersecting with the in-plane direction.

10 Claims, 10 Drawing Sheets

(56) References Cited

U.S. PATENT DOCUMENTS

2022/0390755 A1    12/2022   Yamada et al.
2023/0243636 A1*   8/2023   Yamada .................. G01H 9/00
                                                                356/484
2023/0266161 A1    8/2023   Yamada

FOREIGN PATENT DOCUMENTS

| JP | 2004-350015 A | 12/2004 |
| JP | 2007-285898 A | 11/2007 |
| JP | 2020-165700 A | 10/2020 |
| JP | 2022-038156 A | 3/2022 |
| JP | 2023-120693 A | 8/2023 |

* cited by examiner

LASER INTERFEROMETER

The present application is based on, and claims priority from JP Application Serial Number 2022-191189, filed Nov. 30, 2022, the disclosure of which is hereby incorporated by reference herein in its entirety.

BACKGROUND

1. Technical Field

The present disclosure relates to a laser interferometer.

2. Related Art

JP-A-2020-165700 discloses a laser Doppler measurement device that grasps a movement of a moving object. In the laser Doppler measurement device, an object to be measured is irradiated with laser light, and a movement thereof is measured based on scattered laser light subjected to Doppler shift. Specifically, a shift amount of a frequency of the laser light is obtained by using heterodyne interference, and a speed and a displacement of the moving object are obtained based on the shift amount.

The laser Doppler measurement device disclosed in JP-A-2020-165700 includes a frequency shifter type optical modulator. The optical modulator includes a quartz crystal AT vibrator that performs thickness-shear vibration, and a diffraction grating including a plurality of grooves arranged in a displacement direction of the vibrator. In the optical modulator, since the thickness-shear vibration is in-plane vibration, that is, vibration in a direction intersecting an incident direction of the incident laser light, it is difficult to shift the frequency of the laser light. In other words, in order to efficiently shift the frequency of the laser light, it is required that an inner product of a difference between an incident wave number vector and an emission wave number vector of the laser light and a vibration vector of the quartz crystal AT vibrator is sufficiently large. However, when only the quartz crystal AT vibrator is used, the inner product is substantially zero. Therefore, in the optical modulator described in JP-A-2020-165700, the diffraction grating is combined with the quartz crystal AT vibrator. The diffraction grating has the grooves in a direction intersecting a vibration direction of the quartz crystal AT vibrator. Accordingly, a direction of the vibration vector is converted, the above-described inner product can be made to exceed zero, and the frequency shift of the laser light is possible.

However, provision of a diffraction grating increases a degree of difficulty in manufacturing an optical modulator and increases cost of a laser interferometer. Therefore, an object is to implement a laser interferometer using an optical modulator that enables a frequency shift of laser light without using a diffraction grating.

SUMMARY

A laser interferometer according to an application example of the present disclosure includes: a laser light source configured to emit laser light toward an object; an optical modulator including a vibrator to which the laser light is emitted and configured to modulate the laser light using the vibrator and superimpose a modulation signal on the laser light; a photodetector configured to receive the laser light including a sample signal derived from the object and the modulation signal, and to output a light reception signal; a demodulation circuit configured to demodulate the sample signal from the light reception signal based on a reference signal; and an oscillation circuit configured to operate using the vibrator as a signal source and output the reference signal to the demodulation circuit. The vibrator includes a vibration substrate having a base portion and a vibration unit coupled to the base portion. The vibration unit vibrates along an in-plane direction of the vibration substrate, the vibration unit includes a side surface intersecting with the in-plane direction, and the side surface is irradiated with the laser light.

DESCRIPTION OF EMBODIMENTS

Figure 1:
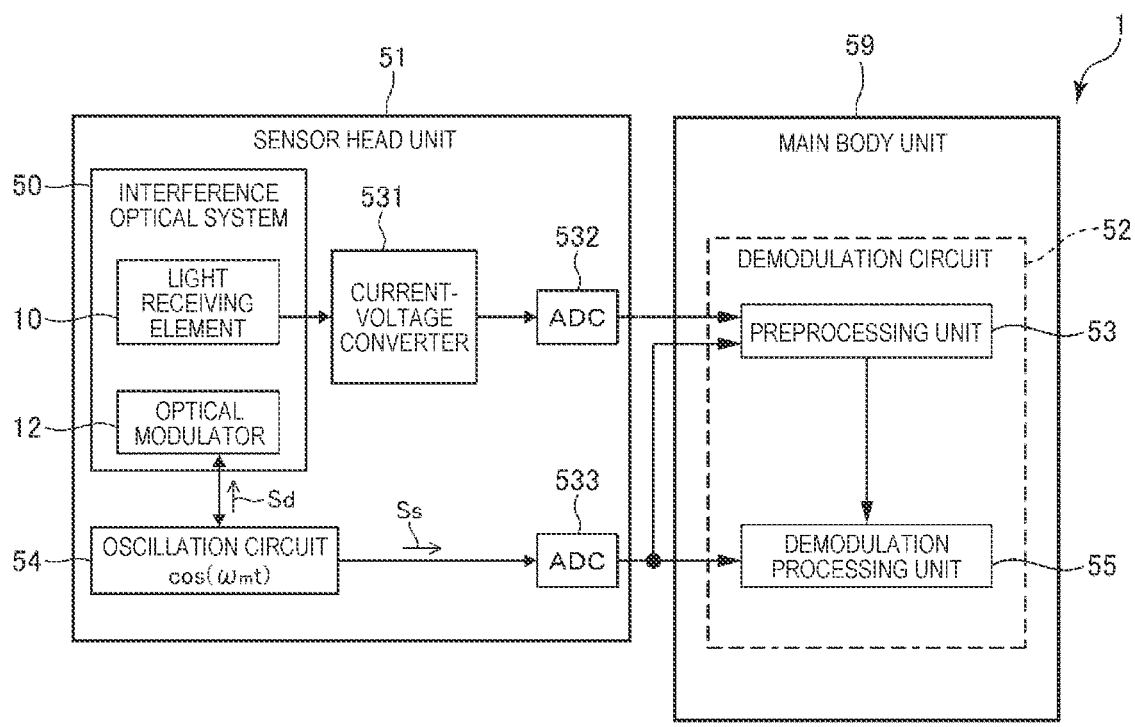
FIG. 1 is a functional block diagram showing a laser interferometer according to an embodiment.
Figure 2:
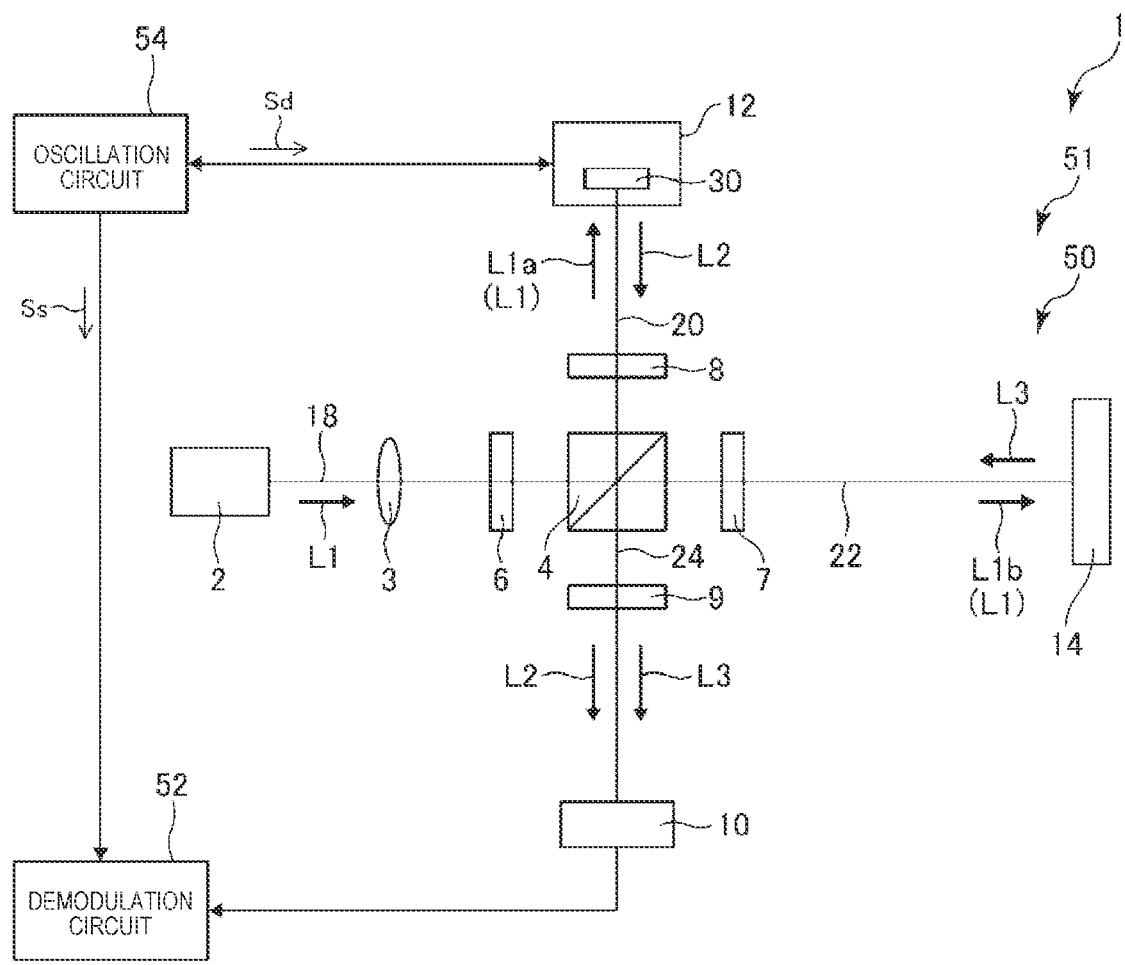
FIG. 2 is a schematic configuration diagram showing a sensor head unit shown in FIG. 1.

Hereinafter, a laser interferometer according to the present disclosure will be described in detail based on an embodiment shown in the accompanying drawings. FIG. 1 is a functional block diagram showing a laser interferometer 1 according to the embodiment. FIG. 2 is a schematic configuration diagram showing a sensor head unit 51 shown in FIG. 1.

The laser interferometer 1 shown in FIG. 1 includes the sensor head unit 51 and a main body unit 59. The sensor head unit 51 includes an interference optical system 50, a current-voltage converter 531, and an oscillation circuit 54. The main body unit 59 includes a demodulation circuit 52 to which a light detection signal from the interference optical system 50 is input. As shown in FIG. 2, the laser interferometer 1 irradiates an object 14 with laser light, and detects and analyzes reflected light. Accordingly, a displacement and a speed of the object 14 are measured.

1. Sensor Head Unit

1.1. Interference Optical System

The interference optical system 50 shown in FIG. 2 is a Michelson interference optical system. As shown in FIG. 2, the interference optical system 50 includes a laser light source 2, a collimator lens 3, a light splitter 4, a half-wavelength plate 6, a quarter-wavelength plate 7, a quarter-wavelength plate 8, an analyzer 9, a photodetector 10, and a frequency shifter type optical modulator 12.

The laser light source 2 emits emission light L1 which is laser light. The photodetector 10 converts received light into an electrical signal. The optical modulator 12 includes a vibrator 30, and changes a frequency of the emission light L1 to generate reference light L2 including a modulation signal (laser light in which the modulation signal is superimposed). The emission light L1 incident on the object 14 is reflected as object light L3 including a sample signal which is a Doppler signal derived from the object 14 (laser light including the sample signal derived from the object 14).

An optical path connecting the light splitter 4 and the laser light source 2 is referred to as an optical path 18. An optical path connecting the light splitter 4 and the optical modulator 12 is referred to as an optical path 20. An optical path connecting the light splitter 4 and the object 14 is referred to as an optical path 22. An optical path connecting the light splitter 4 and the photodetector 10 is referred to as an optical path 24. The "optical path" in the present specification indicates a path which is provided between optical components and along which light travels.

On the optical path 18, the half-wavelength plate 6 and the collimator lens 3 are disposed in this order from a light splitter 4 side. The quarter-wavelength plate 8 is disposed on the optical path 20. The quarter-wavelength plate 7 is disposed on the optical path 22. The analyzer 9 is disposed on the optical path 24.

The emission light L1 emitted from the laser light source 2 passes through the optical path 18 and is split into two light beams by the light splitter 4. First split light L1a, which is one light beam of the split emission light L1, is incident on the optical modulator 12 through the optical path 20. Second split light L1b, which is the other light beam of the split emission light L1, is incident on the object 14 through the optical path 22. The reference light L2, which is generated by the optical modulator 12 modulating a phase of the emission light L1, is incident on the photodetector 10 through the optical path 20 and the optical path 24. The object light L3 generated by the reflection on the object 14 is incident on the photodetector 10 through the optical path 22 and the optical path 24.

In the interference optical system 50 as described above, phase information of the object 14 is obtained by optical heterodyne interferometry. Specifically, two beams of light (the reference light L2 and the object light L3) slightly different in frequency are caused to interfere with each other, and phase information is extracted from the obtained interference light. Then, the displacement of the object 14 is obtained from the phase information in the demodulation circuit 52 to be described later. According to the optical heterodyne interferometry, when the phase information is extracted from the interference light, influence of disturbance, in particular, influence of stray light having a frequency that becomes noise is hardly received, and high robustness is given.

Hereinafter, units of the interference optical system 50 will be further described.

1.1.1. Laser Light Source

The laser light source 2 is a laser light source that emits the emission light L1 having coherence. A light source having a line width of a band of MHz or less may be used as the laser light source 2. Specific examples of the laser light source 2 include a gas laser such as a He—Ne laser, and a semiconductor laser element such as a distributed feedback-laser diode (DFB-LD), a laser diode with fiber bragg grating (FBG-LD), a vertical cavity surface emitting laser (VCSEL) diode, and a Fabry-Perot laser diode (FP-LD).

In particular, the laser light source 2 is preferably a semiconductor laser element. Accordingly, it is possible to reduce a size of the laser light source 2 in particular. Therefore, it is possible to reduce a size of the laser interferometer 1. In particular, in the laser interferometer 1, since the sensor head unit 51 in which the interference optical system 50 is accommodated is reduced in size and weight, it is useful in that operability of the laser interferometer 1, such as a degree of installation freedom of the sensor head unit 51, is improved.

1.1.2. Collimator Lens

The collimator lens 3 is an optical element disposed between the laser light source 2 and the light splitter 4. An example of the collimator lens 3 includes an aspherical lens. The collimator lens 3 collimates the emission light L1 emitted from the laser light source 2. When the emission light L1 emitted from the laser light source 2 is sufficiently collimated, for example, when a gas laser such as a He—Ne laser is used as the laser light source 2, the collimator lens 3 may be omitted.

On the other hand, when the laser light source 2 is a semiconductor laser element, the laser interferometer 1 preferably includes the collimator lens 3 disposed between the laser light source 2 and the light splitter 4. Accordingly, the emission light L1 emitted from the semiconductor laser element can be collimated. As a result, since the emission light L1 becomes collimated light, it is possible to prevent an increase in sizes of various optical components that receive the emission light L1, and it is possible to reduce the size of the laser interferometer 1.

When the emission light L1 that becomes collimated light passes through the half-wavelength plate 6, the emission light L1 is converted into linearly polarized light having an intensity ratio of P-polarized light to S-polarized light of, for example, 50:50, and is incident on the light splitter 4.

1.1.3. Light Splitter

The light splitter 4 is a polarization beam splitter disposed between the laser light source 2 and the optical modulator 12 and between the laser light source 2 and the object 14. The light splitter 4 has a function of transmitting P-polarized light and reflecting S-polarized light. With such a function, the light splitter 4 splits the emission light L1 into the first split light L1a which is light reflected by the light splitter 4 and the second split light L1b which is light transmitted through the light splitter 4.

The first split light L1a, which is S-polarized light reflected by the light splitter 4, is converted into circularly polarized light by the quarter-wavelength plate 8, and is incident on the optical modulator 12. The first split light L1a incident on the optical modulator 12 is subjected to a frequency shift of $f_m$ [Hz] and is reflected as the reference light L2. Therefore, the reference light L2 includes a modulation signal of a frequency $f_m$ [Hz]. The reference light L2 is converted into P-polarized light when the reference light L2 is transmitted through the quarter-wavelength plate 8 again. The P-polarized light of the reference light L2 is transmitted through the light splitter 4 and the analyzer 9 and is incident on the photodetector 10.

The second split light L1b, which is P-polarized light transmitted through the light splitter 4, is converted into circularly polarized light by the quarter-wavelength plate 7, and is incident on the object 14 in a moving state. The second split light L1b incident on the object 14 is subjected to a Doppler shift of $f_d$ [Hz] and is reflected as the object light L3. Therefore, the object light L3 includes a sample signal of a frequency $f_d$ [Hz]. The object light L3 is converted into S-polarized light when the object light L3 is transmitted through the quarter-wavelength plate 7 again. The S-polarized light of the object light L3 is reflected by the light splitter 4, transmitted through the analyzer 9, and is incident on the photodetector 10.

As described above, since the emission light L1 has coherence, the reference light L2 and the object light L3 are incident on the photodetector 10 as interference light.

A non-polarization beam splitter may be used instead of the polarization beam splitter. In this case, the half-wavelength plate 6, the quarter-wavelength plate 7, the quarter-wavelength plate 8, and the like are not necessary. Therefore, it is possible to reduce the size of the laser interferometer 1 by reducing the number of components. A light splitter other than a beam splitter may be used.

1.1.4. Analyzer

Since the S-polarized light and the P-polarized light orthogonal to each other are independent of each other, a beat due to interference does not appear by simply superimposing the S-polarized light and the P-polarized light. Therefore, light waves obtained by superimposing the S-polarized light and the P-polarized light pass through the analyzer 9 being inclined by 45° with respect to both the S-polarized light and the P-polarized light. By using the analyzer 9, it is possible to transmit light having common components and cause the interference. As a result, in the analyzer 9, the reference light L2 and the object light L3 interfere with each other, and interference light having a frequency of $|f_m - f_d|$ [Hz] is generated.

1.1.5. Photodetector

When the interference light is incident on the photodetector 10, the photodetector 10 outputs a photocurrent (a light reception signal) corresponding to an intensity of the interference light. By demodulating a sample signal from the light reception signal by a method to be described later, it is possible to finally obtain a movement, that is, a displacement and a speed of the object 14. Examples of the photodetector 10 include a photodiode. The light received by the photodetector 10 is laser light emitted from the laser light source 2. Any laser light in which the modulation signal and the sample signal are superimposed as a result of the frequency of the light interacting with the vibrations of the optical modulator 12 and the object 14 is acceptable, and is not limited to the interference light described above. In the present specification, "demodulating a sample signal from a light reception signal" includes demodulating a sample signal from various signals converted from a photocurrent (a light reception signal).

1.1.6. Optical Modulator

Figure 3:
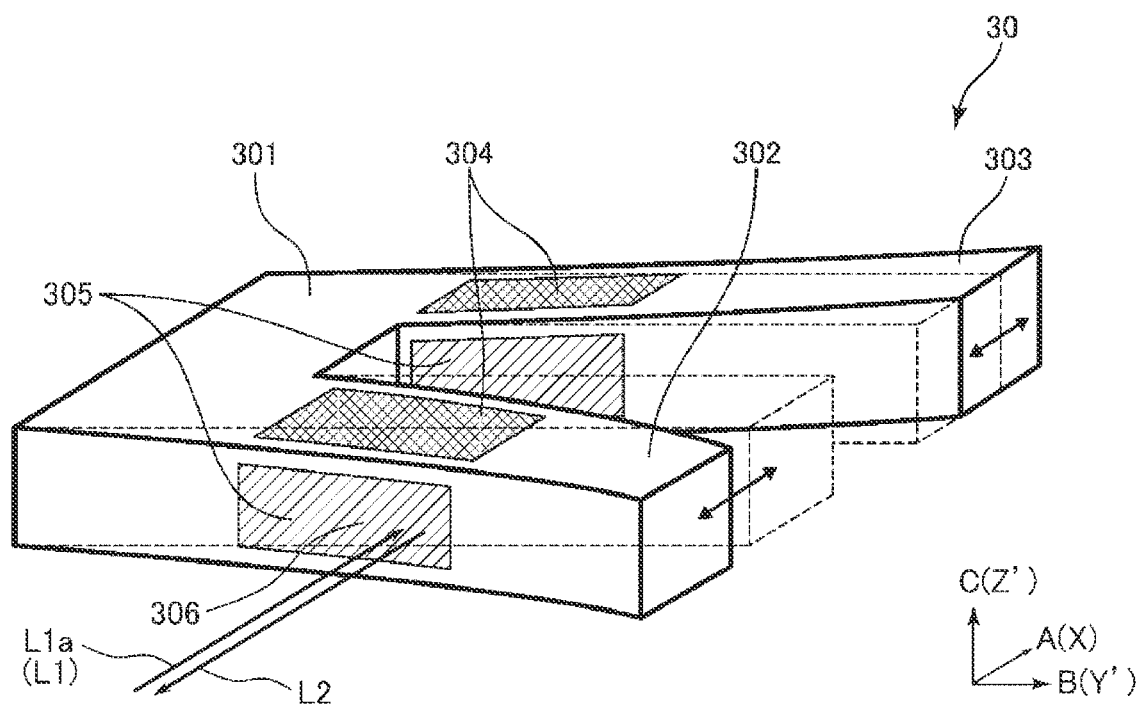
FIG. 3 is a perspective view showing a configuration example of a vibrator provided in an optical modulator shown in FIG. 2.

FIG. 3 is a perspective view showing a configuration example of the vibrator 30 provided in the optical modulator 12 shown in FIG. 2. In FIG. 3, an A axis, a B axis, and a C axis are set as three axes orthogonal to one another, and are indicated by arrows. A tip end side of an arrow is defined as "plus". A base end side of the arrow is defined as "minus". For example, both a plus side direction and a minus side direction of the A axis are referred to as an "A-axis direction". The same applies to a B-axis direction and a C-axis direction.

1.1.6.1. Vibrator

In FIG. 3, a tuning fork type quartz crystal vibrator is used as the vibrator 30. The vibrator 30 shown in FIG. 3 includes a vibration substrate including a base portion 301, a first vibration arm 302, and a second vibration arm 303. Such a tuning fork type quartz crystal vibrator is easily available because a m manufacturing technique is established, and oscillation is also stable. Therefore, the tuning fork type quartz crystal vibrator is suitable as the vibrator 30. The vibrator 30 includes electrodes 304 and 305 and a light reflecting surface 306 provided on the vibration substrate.

The base portion 301 is a portion extending along the A axis. The first vibration arm 302 is a portion extending from an end portion of the base portion 301 on an A-axis minus side toward a B-axis plus side. The second vibration arm 303 is a portion extending from an end portion of the base portion 301 on an A-axis plus side toward the B-axis plus side.

The electrodes 304 are conductive films provided on side surfaces of the first vibration arm 302 and the second vibration arm 303 that are parallel to an A-B plane. Although not shown in FIG. 3, the electrodes 304 are provided on side surfaces facing each other, and voltages are applied to the electrodes 304 such that polarities thereof are different from each other, thereby driving the first vibration arm 302.

The electrodes 305 are conductive films provided on side surfaces of the first vibration arm 302 and the second vibration arm 303 intersecting with the A-B plane. Although not shown in FIG. 3, the electrodes 305 are also provided on side surfaces facing each other, and voltages are applied to the electrodes 305 such that polarities thereof are different from each other, thereby driving the second vibration arm 303.

The light reflecting surface 306 is set on the side surface of the first vibration arm 302 and the second vibration arm 303 intersecting the A-B plane, and has a function of reflecting the emission light L1. The side surface refers to a surface spreading along an extending direction of the first vibration arm 302 and the second vibration arm 303. The light reflecting surface 306 shown in FIG. 3 is set particularly on the surface of the electrode 305 among the side surfaces of the first vibration arm 302. That is, the electrode 305 provided on the first vibration arm 302 has not only a function of applying a voltage to the first vibration arm 302 but also a function of serving as the light reflecting surface 306. A light reflecting film (not shown) may be provided separately from the electrode 305. Therefore, the electrode 305 on which the light reflecting surface 306 is set and the light reflecting film (not shown) are preferably metal films. The metal film has a high reflectance of the emission light L1. Therefore, it is possible to prevent loss caused by reflection of the emission light L1 and to increase a signal-to-noise ratio (an S/N ratio) of the light reception signal. Examples of a material of the metal film include an aluminum simple substance, an alloy thereof, a nickel simple substance, an alloy thereof, a silver simple substance, an alloy thereof, a gold simple substance, and an alloy thereof.

A quartz crystal piece cut out from a quartz crystal substrate is used as the tuning fork type quartz crystal vibrator. Examples of the quartz crystal substrate used for manufacturing the tuning fork type quartz crystal vibrator include a quartz crystal Z-cut flat plate. In FIG. 3, an X axis parallel to the A axis, a Y' axis parallel to the B axis, and a Z' axis parallel to the C axis are set. The quartz crystal Z-cut flat plate is, for example, a substrate cut out from a quartz crystal single crystal such that the X axis is an electrical axis, the Y' axis is a mechanical axis, and the Z' axis is an optical axis. Specifically, in an orthogonal coordinate system including the X axis, the Y' axis, and the Z' axis, a substrate having a main surface inclined by about 1° to 5° counterclockwise from an X-Y' plane including the X axis and the Y' axis around the X axis is cut out from the quartz crystal single crystal and is preferably used as the quartz crystal substrate. Further, by etching such a quartz crystal substrate, a quartz crystal piece used for the vibrator 30 shown in FIG. 3 is obtained. The etching may be wet etching or dry etching.

Figure 4:
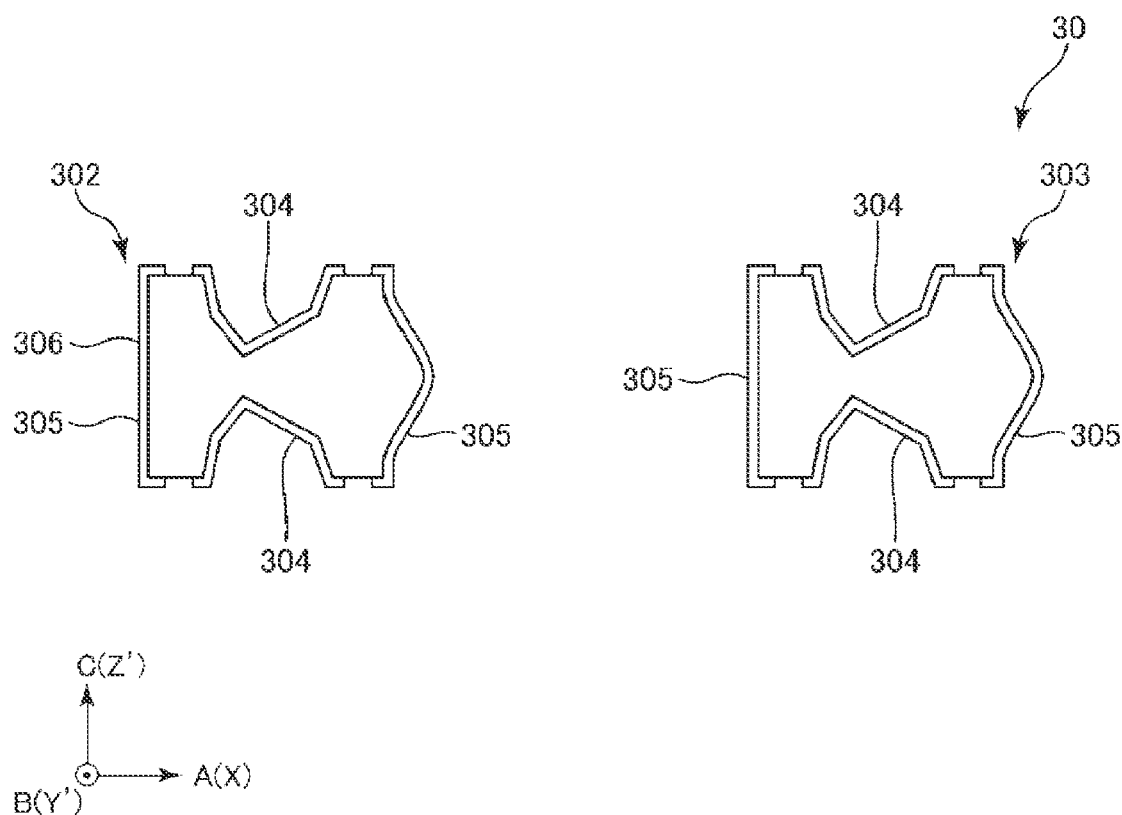
FIG. 4 is a cross-sectional view of the vibrator which is a tuning fork type quartz crystal vibrator cut out from a quartz crystal substrate formed by wet etching.

FIG. 4 is a cross-sectional view of the vibrator 30 which is a tuning fork type quartz crystal vibrator cut out from a quartz crystal substrate formed by the wet etching. The cross-sectional view in FIG. 4 is a cross-sectional view when the first vibration arm 302 and the second vibration arm 303 of the vibrator 30 are cut along an X-Z' plane.

Side surfaces of the first vibration arm 302 and the second vibration arm 303 shown in FIG. 4 are preferably wet etching surfaces. During the wet etching, the wet etching surface with unevenness as shown in FIG. 4 is formed due to anisotropy of an etching rate depending on a crystal orientation of a quartz crystal. In this case, the electrodes 304 and 305 are also provided on the wet etching surfaces, and the light reflecting surface 306 is also set on the surface of the electrode 305 provided on the wet etching surface. In particular, the light reflecting surface 306 shown in FIG. 4 is preferably set on a surface on a minus side of the X axis of the quartz crystal. The surface on the minus side of the X axis of the quartz crystal is a surface excellent in flatness and angle accuracy due to the anisotropy of the etching rate depending on the crystal orientation of the quartz crystal. Therefore, by setting the light reflecting surface 306 on the surface, reflection loss of the incident emission light L1 can be reduced, and optical axis deviation of the emission light L1 and the reference light L2 can be prevented. As a result, the S/N ratio of the light reception signal can be further increased.

On the other hand, the side surfaces of the first vibration arm 302 and the second vibration arm 303 may be dry etching surfaces. During the dry etching, since the anisotropy of the etching rate due to the crystal orientation of the quartz crystal is small, the side surface is cut out at an intended angle and accuracy. Therefore, when the side surface irradiated with the laser light is the dry etching surface, the reflection loss of the incident emission light L1 can be reduced, and the optical axis deviation of the emission light L1 and the reference light L2 can be prevented. As a result, a decrease in the S/N ratio of the light reception signal can be prevented.

The vibrator 30, which is such a tuning fork type quartz crystal vibrator, has an in-plane flexural vibration mode. The in-plane flexural vibration mode is a mode in which the two first vibration arm 302 and the second vibration arm 303 repeatedly approach and separate from each other in the A-B plane, as indicated by double-headed arrows in FIG. 3. That is, the first vibration arm 302 and the second vibration arm 303 perform in-plane flexural vibration along an in-plane direction of the above-described vibration substrate. In FIG. 3, an outer shape at the moment when the first vibration arm 302 and the second vibration arm 303 vibrating in the in-plane flexural vibration mode are displaced to be separated from each other is shown by a solid line, and an outer shape before deformation is shown by a broken line. In such in-plane flexural vibration, each vibration arm is sufficiently long in the B-axis direction, and the closer the vibration arms are to the tip end, the larger the displacement. Therefore, when the first vibration arm 302 and the second vibration arm 303 vibrate in the in-plane flexural vibration mode, a larger displacement amplitude is obtained on the side surface intersecting the A-B plane than on other side surfaces. Therefore, by setting the light reflecting surface 306 on the side surface intersecting the A-B plane, the light reflecting surface 306 vibrating in the A-axis direction (the in-plane direction) can produce a large interaction with the frequency of the incident emission light L1.

The side surface on which the light reflecting surface 306 is set is not particularly limited as long as the surface intersects the A-B plane. That is, when the in-plane flexural vibration is vibration along the plane of the A-B plane, the light reflecting surface 306 is preferably orthogonal to the A-B plane, that is, an angle formed between the light reflecting surface 306 and the A-B plane is preferably 90°, and the angle formed with the A-B plane may be less than 90°. In that case, the angle formed with the A-B plane is preferably 45° or more, and more preferably 60° or more.

The in-plane flexural vibration mode may include a plurality of modes having different resonance frequencies. For example, when a mode in which the resonance frequency is 32.768 kHz is set as a main vibration mode, a secondary vibration mode with a higher resonance frequency may be included. In the case of the tuning fork type quartz crystal vibrator, a mode in which the resonance frequency is about 200 to 300 kHz (a second harmonic mode) is an example of the secondary vibration mode. The main vibration mode and the secondary vibration mode can be selectively excited by selecting signals input to the electrodes 304 and 305.

When the light reflecting surface 306 is vibrated in a direction parallel to the incident direction of the emission light L1, the interaction between the vibration of the light reflecting surface 306 and the frequency of the emission light L1 increases. As a result, it is possible to implement the optical modulator 12 that enables a frequency shift of the emission light L1 without using a diffraction grating which is necessary for an optical modulator in the related art. Accordingly, it is possible to lower a degree of difficulty in manufacturing the optical modulator 12 by an amount corresponding to non-necessity of the diffraction grating, and it is possible to reduce cost of the laser interferometer 1.

As described above, a magnitude of the optical modulation performed by the optical modulator 12 is given by an inner product of a difference between an incident wave number vector of the emission light L1 incident on the light reflecting surface 306 and an emission wave number vector of the reference light L2 emitted from the optical modulator 12, and a vibration vector of the light reflecting surface 306.

As shown in FIG. 3, when the light reflecting surface 306 vibrates along the A axis and the emission light L1 is incident on the light reflecting surface 306 along the A axis, the frequency of the emission light L1 shifts due to a Doppler effect. Further, the emission light L1 after modulation is emitted as the reference light L2. At this time, the inner product of the difference between the incident wave number vector of the emission light L1 and the emission wave number vector of the reference light L2 and the vibration vector of the light reflecting surface 306 exceeds zero and is sufficiently large. Accordingly, efficiency of optical modulation performed by the optical modulator 12 can be increased without using a diffraction grating. As a result, it is possible to lower the degree of difficulty in manufacturing the optical modulator 12, and thus it is possible to easily reduce cost of the optical modulator 12 and the laser interferometer 1.

A length of the vibrator 30 in the B-axis direction is preferably about 0.2 mm or more and 5.0 mm or less. A thickness of the vibrator 30 in the C-axis direction is preferably about 0.003 mm or more and 0.5 mm or less, and more preferably about 0.1 mm or more and 0.3 mm or less.

A shape of the tuning fork type quartz crystal vibrator is not limited to the two-legged tuning fork type including the first vibration arm 302 and the second vibration arm 303 as shown in FIG. 3, and examples thereof include, in addition to cantilever beam shapes of a three-legged tuning fork type and a four-legged tuning fork type, a shape in which the vibration arms extending from the base portion 301 to both the B-axis plus side and a B-axis minus side are supported by the base portion 301, and a shape in which the vibration arms extending from the base portion 301 on both sides of the B axis and on both sides of the A axis are supported by the base portion 301.

In the vibrator 30 shown in FIG. 3, a width of the first vibration arm 302 and a width of the second vibration arm 303 are substantially constant over the entire length. The width is a width in the A-axis direction. On the other hand, the width of the first vibration arm 302 and the width of the second vibration arm 303 may be partially different from each other. A vibration arm having such a shape is also referred to as a hammer head type vibration arm. A larger vibration displacement can be obtained by adopting a hammer head type vibration arm.

When a drive signal Sd is supplied (an AC voltage is applied) from the oscillation circuit 54 shown in FIGS. 1 and 2 to the vibrator 30 shown in FIG. 3, the vibrator 30 oscillates. Electric power (excitation power) required for the oscillation of the vibrator 30 is not particularly limited, and is as small as about 0.1 μW to 100 mW. Therefore, the drive signal Sd output from the oscillation circuit 54 can be used to cause the vibrator 30 to oscillate without being amplified.

As compared with an acousto-optic modulator (AOM) or an electro-optic modulator (EOM) which is an optical modulator in the related art, a volume of the vibrator 30 is fairly small and electric power required for an operation is also small. Therefore, by using the vibrator 30, it is possible to easily reduce a size and electric power consumption of the laser interferometer 1.

In addition, the vibrator 30 is not limited to the quartz crystal vibrator, and may be a silicon vibrator or a ceramic vibrator as long as the vibrator has an in-plane flexural vibration mode. The quartz crystal vibrator, the silicon vibrator, and the ceramic vibrator are different from other vibrators such as a piezoelectric element, and are vibrators using a resonance phenomenon, and thus have a high Q value and can easily have a stabilized natural frequency. In the present specification, such a vibrator using a resonance phenomenon based on a high Q value, particularly a Q value satisfying $1000 \leq Q$, is referred to as a "self-excited oscillation vibrator". By using the self-excited oscillation vibrator as the vibrator 30, a modulation signal can be stabilized, and the oscillation circuit 54 operating with the vibrator 30 as a signal source can output the reference signal Ss having higher accuracy. In addition, both the modulation signal and the reference signal Ss are processed in real time by the demodulation circuit 52. For this reason, even when both signals are subjected to disturbances, the disturbances are balanced or reduced by each other, and processing results thereof are less likely to be affected. Therefore, a sample signal derived from the object 14 can be demodulated at a high S/N ratio (a signal-to-noise ratio). The laser interferometer 1 capable of measuring the speed and the displacement of the object 14 with higher accuracy can be implemented.

The silicon vibrator is a vibrator that includes a single crystal silicon piece manufactured from a single crystal silicon substrate by using a micro electro mechanical systems (MEMS) technique, and a piezoelectric film. The MEMS refers to a micro electro mechanical system. Examples of a shape of the single crystal silicon piece include a cantilever beam shape such as a two-legged tuning fork type and a three-legged tuning fork type. An oscillation frequency of the silicon vibrator is, for example, about 1 kHz to several hundreds of MHz.

The ceramic vibrator is a vibrator that includes a piezoelectric ceramic piece manufactured by sintering a piezoelectric ceramic, and an electrode. Examples of the piezoelectric ceramic include lead zirconate titanate (PZT) and barium titanate (BTO). An oscillation frequency of the ceramic vibrator is, for example, about several hundreds of kHz to several tens of MHz.

In addition, in the ceramic vibrator, not only flexural vibration but also in-plane vibration such as length vibration and spread vibration can be used.

1.1.6.2. Package Structure

Figure 5:
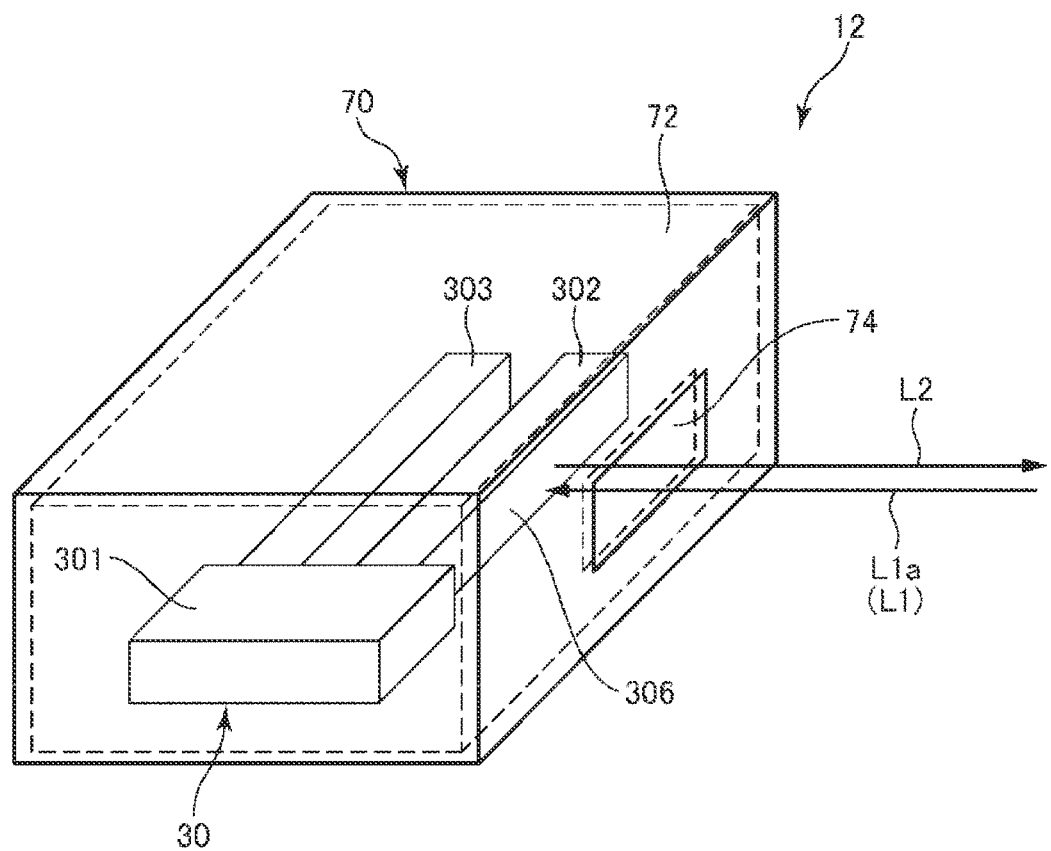
FIG. 5 is a perspective view showing the optical modulator having a package structure.
Figure 6:
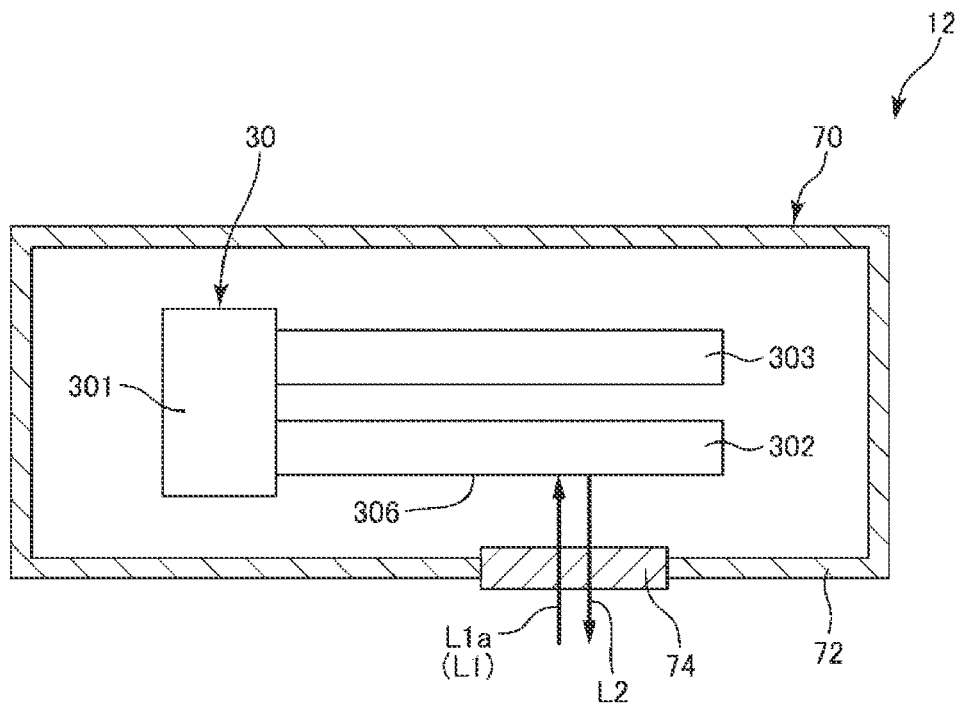
FIG. 6 is a cross-sectional view of the optical modulator shown in FIG. 5.

The optical modulator 12 may have a package structure. FIG. 5 is a perspective view showing the optical modulator 12 having the package structure. FIG. 6 is a cross-sectional view of the optical modulator 12 shown in FIG. 5. The package structure refers to a structure in which the vibrator 30 is hermetically sealed in a container 70 (housing) shown in FIGS. 5 and 6.

The optical modulator 12 shown in FIGS. 5 and 6 includes the container 70 having an accommodating portion and the vibrator 30 accommodated in the container 70.

As shown in FIGS. 5 and 6, the container 70 includes a container body 72 and a transmission window 74. The container body 72 is formed of a ceramic material, a glass material, or the like. Although not shown, the container body 72 includes a lid that closes an opening (not shown), an internal terminal provided on an inner surface, an external terminal provided on an outer surface, a wiring coupling the internal terminal and the external terminal, and the like.

The accommodating portion of the container 70 is hermetically sealed as described above. Accordingly, the accommodating portion can be maintained in a depressurized state. By depressurizing the accommodating portion, it is possible to reduce air resistance in the in-plane flexural vibration of the vibrator 30. Therefore, it is possible to increase vibration efficiency of the vibrator 30 accommodated in the accommodating portion and to stabilize the vibration. In addition, deterioration of the light reflecting surface 306 over time can be reduced, and good light reflectance can be maintained. As a result, an S/N ratio of a modulation signal can be further increased.

A pressure of the depressurized accommodating portion is not particularly limited as long as the pressure is less than an atmospheric pressure, and is preferably 100 Pa or less. On the other hand, a lower limit value may be set to about 10 Pa in consideration of satisfactorily maintaining the depressurized state. Under such a pressure, a crystal impedance (CI) value of the tuning fork type quartz crystal vibrator can be reduced. For example, the CI value under the atmospheric pressure is about 200 kΩ to 400 kΩ, and can be reduced to about 20 kΩ to 50 kΩ under the above pressure. Accordingly, the S/N ratio of the modulation signal can be particularly increased.

The hermetical sealing of the container 70 and the depressurization of the accommodating portion are not essential, and may be omitted.

The package structure shown in FIGS. 5 and 6 can reduce degassing, which is a cause of lowering a degree of vacuum, to be slight as compared with, for example, a case where the entire interference optical system 50 is hermetically sealed. Accordingly, in the optical modulator 12 adopting the package structure, long-term reliability is easily enhanced.

A shape, a material, a size, and the like of the transmission window 74 are not particularly limited as long as the transmission window 74 is a member that can transmit the laser light. Examples of the material of the transmission window 74 include a glass material and a crystal material. The transmission window 74 shown in FIG. 6 has a flat plate shape as an example. By providing the transmission window 74, the material of the container body 72 can be freely selected with emphasis on airtightness, insulating properties, and the like. Therefore, the optical modulator 12 having further excellent long-term reliability can be implemented. An anti-reflection film may be provided on a surface of the transmission window 74. Accordingly, the emission light L1 and the reference light L2 to be transmitted can be prevented from being unintentionally reflected at the transmission window 74.

Figure 7:
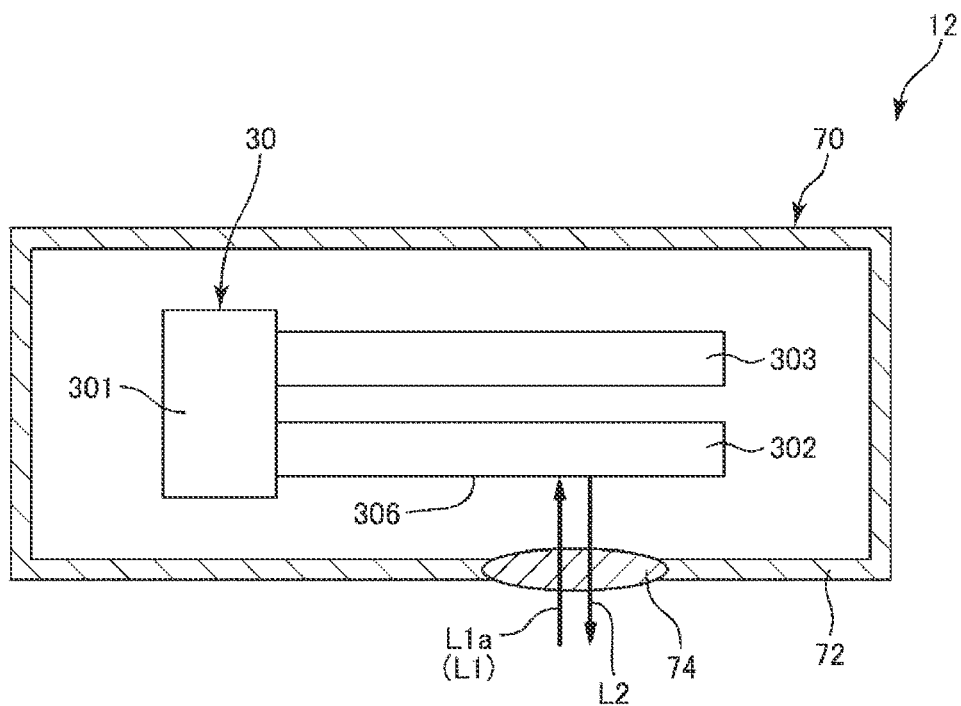
FIG. 7 is a cross-sectional view showing a modification of the optical modulator in FIG. 6.

FIG. 7 is a cross-sectional view showing a modification of the optical modulator 12 in FIG. 6. The optical modulator 12 shown in FIG. 7 is the same as the optical modulator 12 shown in FIG. 6 except that the shape of the transmission window 74 is different.

The transmission window 74 shown in FIG. 7 has a surface in a curved surface shape. Accordingly, the transmission window 74 can be provided with not only a function of transmitting the emission light L1 and the reference light L2 but also a function of adjusting traveling directions of the emission light L1 and the reference light L2. As an example, the transmission window 74 can be provided with a function of serving as a condensing lens. Accordingly, it is possible to converge the emission light L1 and narrow a range of incidence on the light reflecting surface 306. As a result, even when the vibrator 30 is small, the light reflecting surface 306 can be more reliably irradiated with the emission light L1. In addition, the reference light L2 can be collimated to narrow a range of incidence on the light splitter 4. As a result, it is possible to reduce a size of the interference optical system 50.

Examples of the curved surface shape include a convex curved surface shape. In particular, an aspherical surface shape is preferably used. Accordingly, various aberrations in a lens can be reduced. An anti-reflection film may also be provided on a surface of the transmission window 74 shown in FIG. 7.

Figure 8:
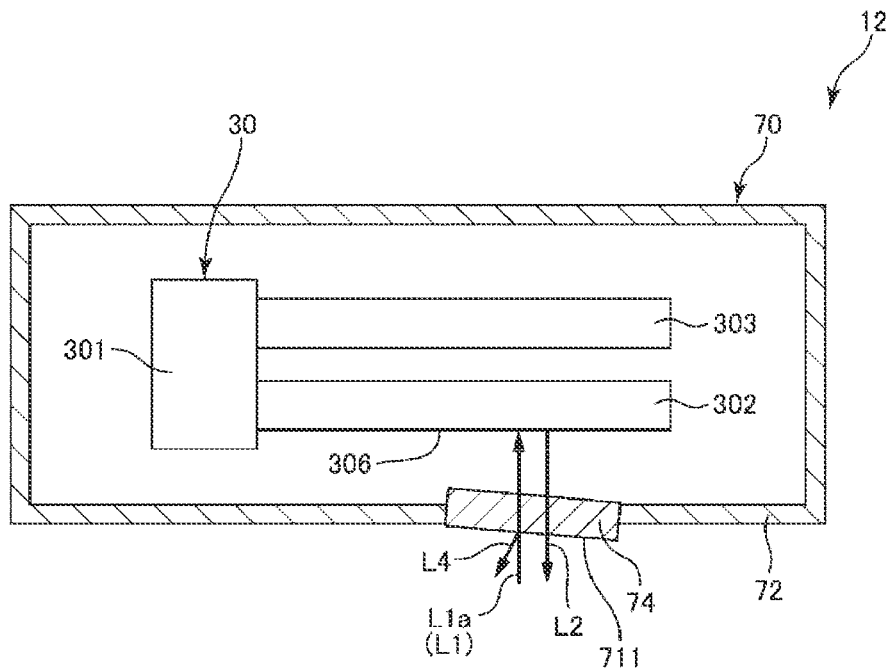
FIG. 8 is a cross-sectional view showing a modification of the optical modulator in FIG. 6.

FIG. 8 is a cross-sectional view showing a modification of the optical modulator 12 in FIG. 6. The optical modulator 12 shown in FIG. 8 is the same as the optical modulator 12 shown in FIG. 6 except that a posture of the transmission window 74 is different.

The transmission window 74 shown in FIG. 8 is made of a material that can transmit laser light and has a flat plate shape, similar to the transmission window 74 shown in FIG. 6. The transmission window 74 shown in FIG. 8 is provided in a posture inclined with respect to an incident direction of the emission light L1. In other words, an incident angle of the emission light L1 with respect to an incident surface 711 (an angle formed by a normal line of the incident surface 711 and an incident path of the emission light L1) is set to be more than 0°. Accordingly, even when the emission light L1 incident on the incident surface 711 is reflected by the incident surface 711 and reflected light L4 is generated, probability that the reflected light L4 is incident on the photodetector 10 or the laser light source 2 can be reduced. When the reflected light L4 is incident on the photodetector 10, an S/N ratio of a light reception signal may decrease. When the reflected light L4 is incident on the laser light source 2, laser oscillation in the laser light source 2 may be unstable. Therefore, by using the container 70 having the transmission window 74 provided in an inclined posture, it is possible to prevent a decrease in the S/N ratio of the light reception signal and to prevent instability of the laser oscillation.

The angle formed by the normal line of the incident surface 711 and the incident path of the emission light L1 is preferably 5.0° or less, more preferably 0.05° or more and 3.0° or less, and still more preferably 0.10° or more and 2.0° or less. Accordingly, it is possible to prevent a decrease in transmission efficiency of the emission light L1 in the transmission window 74 while reducing the probability that the reflected light L4 is incident on the photodetector 10 or the laser light source 2.

1.2. Hermetically-Sealed Structure

In FIGS. 6 to 8, the package structures in which the vibrator 30 is hermetically sealed are shown, and a part or all of the sensor head unit 51 may have a hermetically-sealed structure.

Figure 9:
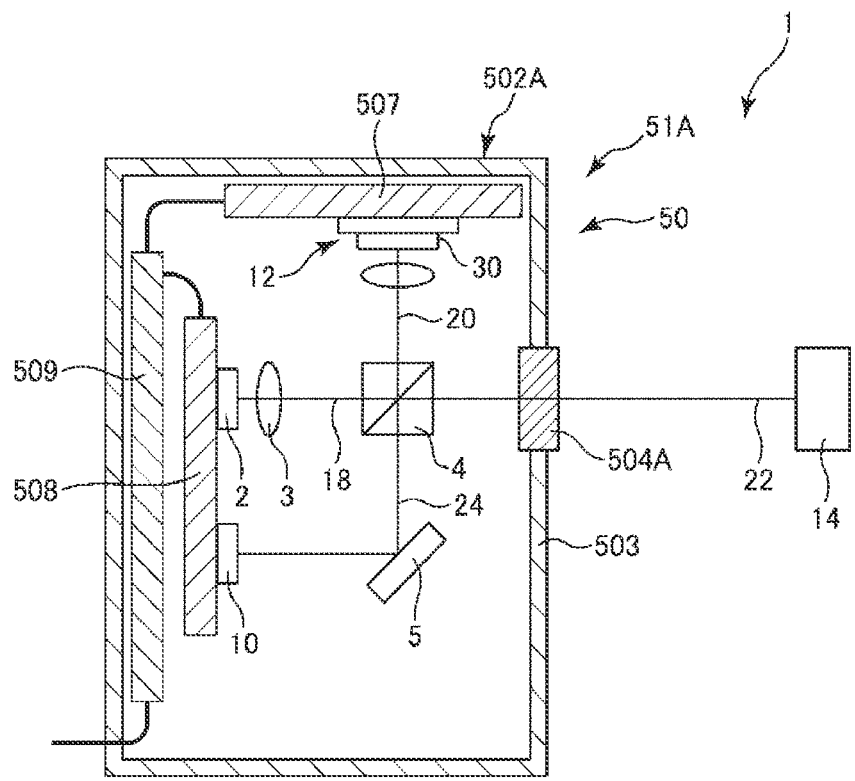
FIG. 9 is a cross-sectional view showing a modification of the sensor head unit in FIG. 1.
Figure 10:
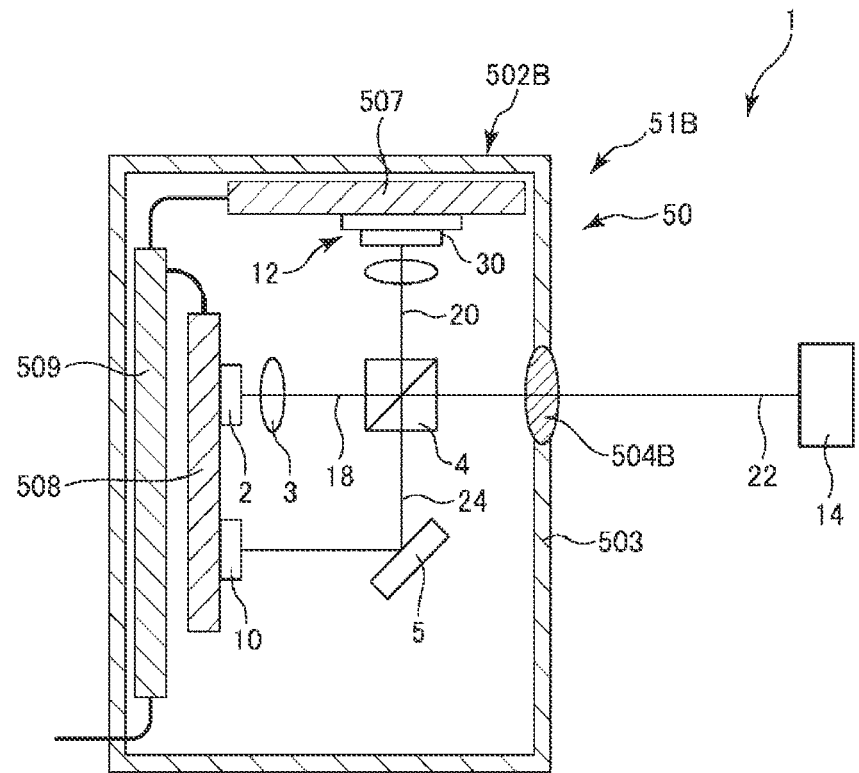
FIG. 10 is a cross-sectional view showing a modification of the sensor head unit in FIG. 1.
Figure 11:
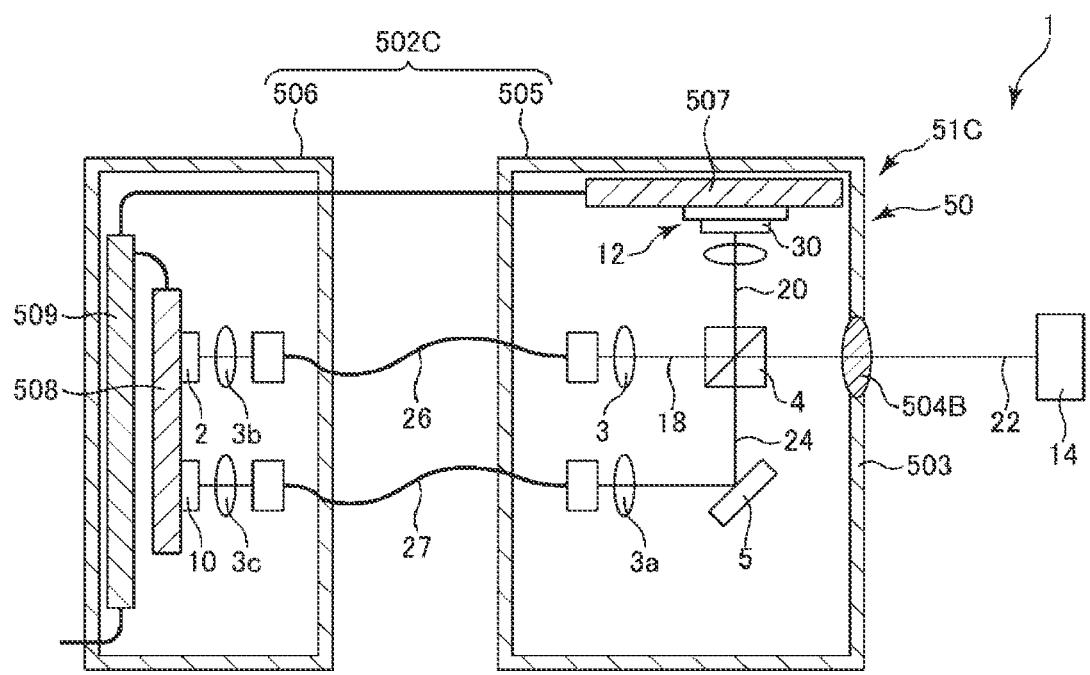
FIG. 11 is a cross-sectional view showing a modification of the sensor head unit in FIG. 1.

FIGS. 9 to 11 are cross-sectional views showing modifications of the sensor head unit 51 in FIG. 1. The hermetically-sealed structure refers to a structure in which at least the vibrator 30 is hermetically sealed within cases 502A, 502B, and 502C (housings) shown in FIGS. 9 to 11.

A sensor head unit 51A shown in FIG. 9 includes the case 502A having an accommodating portion, the interference optical system 50 accommodated in the case 502A, and wiring boards 507, 508, and 509. In FIG. 9, illustration of a part of the optical elements in the interference optical system 50 in FIG. 2 is omitted.

As shown in FIG. 9, the case 502A includes a case body 503 and a transmission window 504A. The case body 503 is made of, for example, a metal material or a ceramic material.

The transmission window 504A is fitted into a hole provided in the case body 503. A material that can transmit laser light, such as a glass material or a crystal material, is used as a material of the transmission window 504A. The transmission window 504A may have a configuration and a function same as those of the transmission window 74 shown in FIG. 6. That is, the transmission window 504A may be provided in a posture inclined with respect to a reference surface, or may be provided with an anti-reflection film on a surface thereof.

The wiring board 507 supports the optical modulator 12 and is electrically coupled to the optical modulator 12. The wiring board 508 supports the photodetector 10 and the laser light source 2, and is electrically coupled thereto. The wiring board 509 is electrically coupled to the wiring boards 507 and 508, and is electrically coupled to an outside. Note that "being electrically coupled" refers to being coupled by an electric power line and a communication line.

A reflecting element 5 is added to the interference optical system 50 shown in FIG. 9. The reflecting element 5 is disposed on the optical path 24 and changes traveling directions of the reference light L2 and the object light L3.

A sensor head unit 51B shown in FIG. 10 includes the case 502B having an accommodating portion, the interference optical system 50 accommodated in the case 502B, and the wiring boards 507, 508, and 509. In FIG. 10, illustration of a part of the optical elements in the interference optical system 50 in FIG. 2 is omitted.

As shown in FIG. 10, the case 502B includes the case body 503 and a transmission window 504B. The transmission window 504B is fitted into a hole provided in the case body 503. The transmission window 504B has a configuration and a function same as those of the transmission window 74 shown in FIG. 7. That is, the transmission window 504B is provided with a function of serving as the condensing lens. An anti-reflection film may also be provided on a surface of the transmission window 504B.

A sensor head unit 51C shown in FIG. 11 includes the case 502C having an accommodating portion, the interference optical system 50 accommodated in the case 502C, and the wiring boards 507, 508, and 509. In FIG. 11, illustration of a part of the optical elements in the interference optical system 50 in FIG. 2 is omitted.

As shown in FIG. 11, the case 502C includes a first case 505 and a second case 506. In addition, condensing lenses 3a, 3b, and 3c and optical fibers 26 and 27 are added in the interference optical system 50 shown in FIG. 11.

The first case 505 includes the case body 503 and the transmission window 504B. The first case 505 accommodates the collimator lens 3, the condensing lens 3a, the light splitter 4, the reflecting element 5, the optical modulator 12, and the wiring board 507 in the interference optical system 50. On the other hand, the second case 506 accommodates the laser light source 2, the photodetector 10, the condensing lens 3b, the condensing lens 3c, and the wiring boards 508 and 509 in the interference optical system 50.

The optical fibers 26 and 27 have a large part thereof disposed outside, and optically couple the accommodating portion of the first case 505 and the accommodating portion of the second case 506.

On the optical path 18 connecting the light splitter 4 and the laser light source 2, the collimator lens 3, the optical fiber 26, and the condensing lens 3b are disposed in this order from a light splitter 4 side. On the optical path 24 connecting the light splitter 4 and the photodetector 10, the reflecting element 5, the condensing lens 3a, the optical fiber 27, and the condensing lens 3c are disposed in this order from the light splitter 4 side.

The accommodating portions of the cases 502A, 502B, and 502C are preferably hermetically sealed. Accordingly, the accommodating portion can be maintained in a depressurized state. By depressurizing the accommodating portion, it is possible to reduce air resistance in the in-plane vibration of the vibrator 30 accommodated in the accommodating portion even when the optical modulator 12 does not have a package structure. Therefore, vibration efficiency of the vibrator 30 can be increased.

According to such cases 502A, 502B, and 502C, the laser light source 2 can also be held under a reduced pressure. Accordingly, it is possible to prevent deterioration of the laser light source 2 caused by a change in humidity or atmospheric pressure. Specifically, it is possible to prevent fluctuation of an oscillation wavelength or the like.

A part of the optical elements constituting the interference optical system 50 may be disposed outside the cases 502A, 502B, and 502C.

1.3. Current-Voltage Converter

The current-voltage converter 531 is also called a transimpedance amplifier (TIA), and converts a photocurrent (a light reception signal) output from the photodetector 10 into a voltage signal and outputs the voltage signal as a light detection signal.

An ADC 532 shown in FIG. 1 is disposed between the current-voltage converter 531 and the demodulation circuit 52. An ADC 533 shown in FIG. 1 is disposed between the oscillation circuit 54 and the demodulation circuit 52 to be described later. The ADCs 532 and 533 are analog-to-digital converters, and convert an analog signal into a digital signal at a predetermined sampling bit rate. The ADCs 532 and 533 are provided in the sensor head unit 51.

The interference optical system 50 may include a plurality of photodetectors 10. In this case, differential amplifier circuit is provided between the plurality of photodetectors 10 and the current-voltage converter 531, so that it is possible to perform differential amplification processing on a photocurrent and increase an S/N ratio of a light detection signal. The differential amplification processing may be performed on a voltage signal.

1.4. Oscillation Circuit

The oscillation circuit 54 outputs the drive signal Sd to the vibrator 30. The oscillation circuit 54 outputs the reference signal Ss to the demodulation circuit 52.

The oscillation circuit 54 operates using the vibrator 30 as a signal source, and generates a highly accurate periodic signal. Accordingly, the oscillation circuit 54 outputs the highly accurate drive signal Sd, and outputs the reference signal Ss. Accordingly, when subjected to the disturbance, the drive signal Sd and the reference signal Ss are influenced in the same manner with each other. As a result, the modulation signal added via the vibrator 30 driven by the drive signal Sd and the reference signal Ss are influenced in the same manner with each other. Therefore, when the modulation signal and the reference signal Ss are subjected to calculation in the demodulation circuit 52, the influence of the disturbance included in both the signals can be balanced or reduced with each other in a process of the calculation. As a result, the demodulation circuit 52 can accurately obtain the position and the speed of the object 14 even when subjected to the disturbance.

Examples of the oscillation circuit 54 include an oscillation circuit disclosed in JP-A-2022-38156.

2. Demodulation Circuit

The demodulation circuit 52 performs demodulation processing of demodulating a sample signal derived from the object 14, from a light detection signal output from the current-voltage converter 531. The sample signal includes, for example, phase information and frequency information. Further, the displacement of the object 14 can be acquired based on the phase information, and the speed of the object 14 can be acquired based on the frequency information. When different physical quantities can be acquired as described, the laser interferometer 1 can have functions of serving as a displacement meter and a speedometer. Therefore, it is possible to improve functionality of the laser interferometer 1.

The demodulation circuit 52 includes a preprocessing unit 53 and a demodulation processing unit 55. Functions exhibited by the functional units are implemented by hardware including, for example, a processor, a memory, an external interface, an input unit, and a display unit. Specifically, the functions are implemented by the processor reading and executing a program stored in the memory. The components can communicate with one another by an internal bus.

Examples of the processor include a central processing unit (CPU) and a digital signal processor (DSP). Instead of a method in which these processors execute software, a method in which a field-programmable gate array (FPGA), an application specific integrated circuit (ASIC), and the like implement the functions described above may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input and output port such as a universal serial bus (USB), and an Ethernet (registered trademark) port.

Examples of the input unit include various input devices such as a keyboard, a mouse, a touch panel, and a touch pad. Examples of the display unit include a liquid quartz crystal display panel and an organic electro luminescence (EL) display panel.

The external interface, the input unit, and the display unit may be provided when necessary and may be omitted.

For example, a preprocessing unit and a demodulation unit disclosed in JP-A-2022-38156 can be applied to the preprocessing unit 53 and the demodulation processing unit 55.

The preprocessing unit 53 performs preprocessing on the light detection signal based on the reference signal Ss. In the preprocessing, the light detection signal is divided into two signals PASS1 and PASS2, one of which is multiplied by the reference signal Ss, and then the two signals PASS1 and PASS2 are added to output a preprocessed signal.

The demodulation processing unit 55 demodulates a sample signal corresponding to the speed and the position of the object 14 based on the reference signal Ss from the preprocessed signal output from the preprocessing unit 53.

Here, when amplitude values of the two signals PASS1 and PASS2 in the preprocessing unit 53 are $J_1(B)$ and $J_2(B)$, an S/N ratio of the preprocessed signal is particularly high when the amplitude values are equal. Each of the amplitude values $J_1(B)$ and $J_2(B)$ is a vessel coefficient, $J_1(B)$ is a primary vessel coefficient, and $J_2(B)$ is a secondary vessel coefficient. B is a phase shift of the modulation signal. $J_1(B)$ and $J_2(B)$ independently vary according to a B value. The B value when $J_1(B)=J_2(B)$ is about 2.6. Therefore, when the interference optical system 50 can be implemented such that B=2.6, the S/N ratio of the preprocessed signal can be particularly increased.

For example, when a tuning fork type quartz crystal vibrator having a resonance frequency of 32 kHz is oscillated at a drive voltage of 3 V, there is actual measurement data that a vibration displacement Lq in the A-axis direction (an X-axis direction of quartz crystal) of a tip end of the vibration arm is about 1200 nm even under an atmospheric pressure. Based on the vibration displacement Lq, when the phase shift B of the modulation signal in a case of using laser light having a wavelength λ of 850 nm is calculated using $B=4\pi Lq/\lambda$, B=about 17.7 is obtained. Therefore, a sufficiently large B value can be obtained with the vibrator 30 that excites the in-plane flexural vibration.

In the vibration arm that performs the in-plane flexural vibration, by appropriately selecting the position of the light reflecting surface 306, specifically, by disposing the light reflecting surface 306 closer to the base end side rather than the tip end of the vibration arm, the vibration displacement Lq can be made smaller, and the B value can be made smaller than 17.7. In this manner, the position of the light reflecting surface 306 may be selected such that an appropriate B value is obtained.

On the other hand, the vibration displacement Lq of the vibrator 30 can be adjusted based on the drive voltage (the excitation power). In general, as the drive voltage increases, the vibration displacement Lq can be increased. Therefore, for example, by reducing the drive voltage from 3 V, the vibration displacement Lq can be reduced. For example, when setting the light reflecting surface 306 at the tip end of the vibration arm, when the drive voltage is reduced to about 0.3 to 1 V, B=about 2.6 can be achieved. Accordingly, the B value can be optimized, and electric power consumption of the optical modulator 12 can be reduced.

Depending on the configuration of the demodulation circuit 52, it may be desirable to increase the B value as much as possible. By increasing the B value, for example, when displacement measurement of the object 14 is performed, a measurement result is less likely to be affected by the disturbance. That is, robustness of the measurement can be enhanced. Further, measurement accuracy can be increased by increasing the B value. The B value is preferably 0.5 or more, and more preferably 1.0 or more.

The in-plane flexural vibration has a lower resonance frequency (a natural frequency) than that of the thickness-shear vibration. Therefore, according to the embodiment using the in-plane flexural vibration, a frequency of the modulation signal or a reference signal Ss can be reduced as compared with that of a laser interferometer using a related-art optical modulator using the thickness-shear vibration.

For example, the resonance frequency of the thickness-shear vibration is often in an MHz band, whereas the resonance frequency of the in-plane flexural vibration is often in a kHz band. The resonance frequency of the vibrator 30 is preferably 10 kHz or more and less than 1 MHz, and more preferably 20 kHz or more and 100 kHz or less. Accordingly, the number of sampling bits of an analog-to-digital converter (ADC) that processes the modulation signal and the reference signal Ss and a requirement for processing performance of a processor such as a CPU and an FPGA can be reduced. As a result, cost of the laser interferometer 1 can be easily reduced.

3. Modifications of Optical System

Next, first to fourth modifications of the interference optical system 50 will be described.

Figure 12:
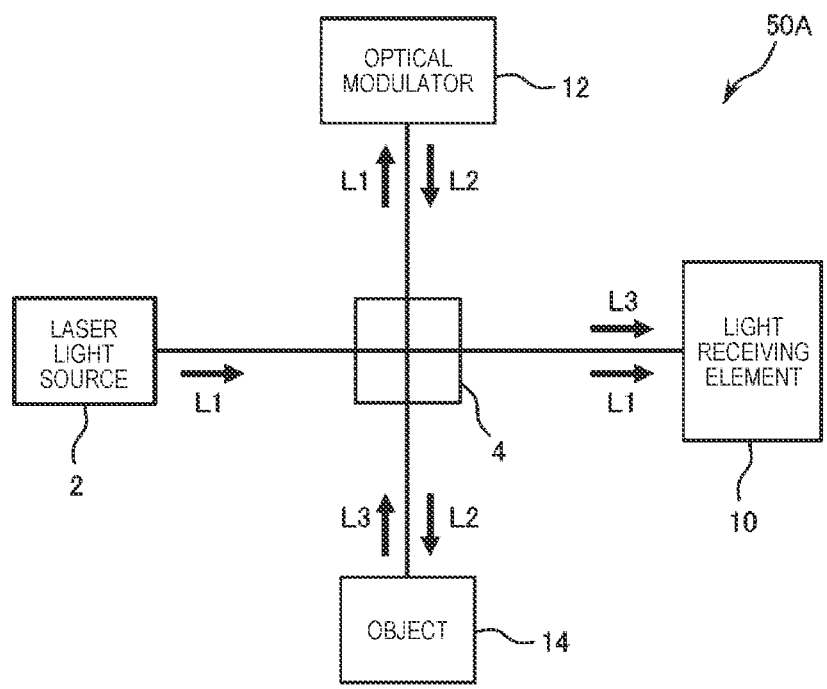
FIG. 12 is a schematic configuration diagram showing an interference optical system according to a first modification.
Figure 13:
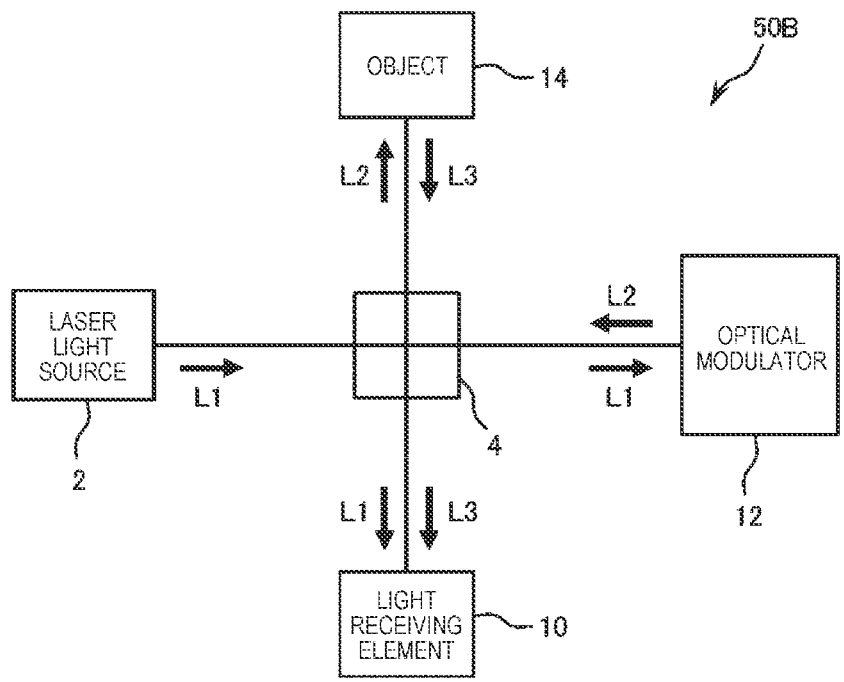
FIG. 13 is a schematic configuration diagram showing an interference optical system according to a second modification.
Figure 14:
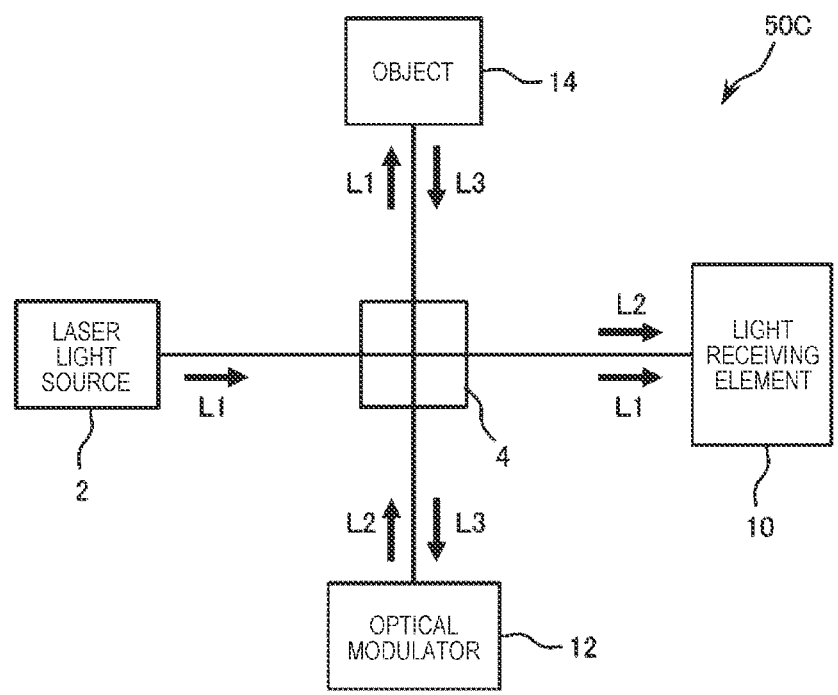
FIG. 14 is a schematic configuration diagram showing an interference optical system according to a third modification.
Figure 15:
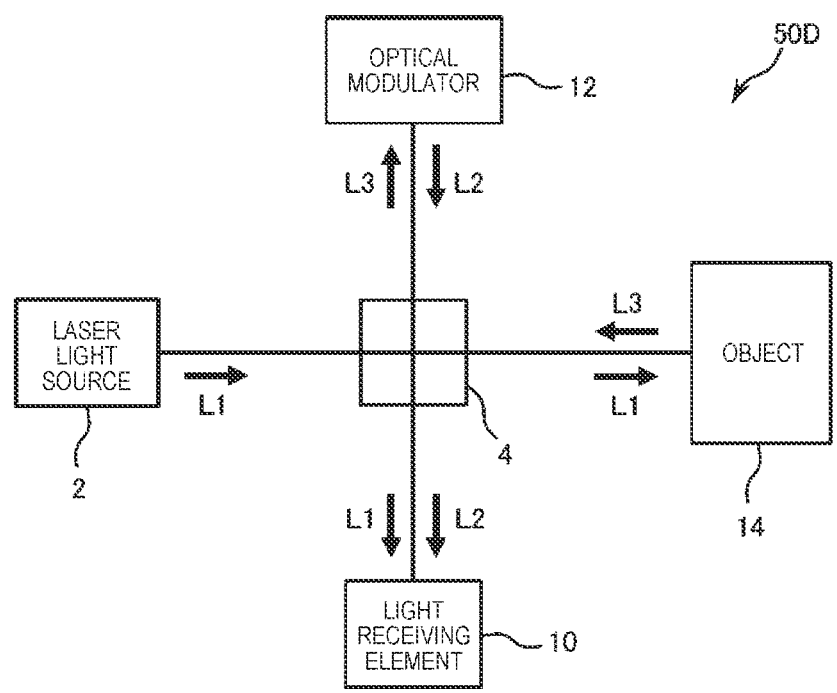
FIG. 15 is a schematic configuration diagram showing an interference optical system according to a fourth modification.

FIG. 12 is a schematic configuration diagram showing an interference optical system 50A according to a first modification. FIG. 13 is a schematic configuration diagram showing an interference optical system 50B according to a second modification. FIG. 14 is a schematic configuration diagram showing an interference optical system 50C according to a third modification. FIG. 15 is a schematic configuration diagram showing an interference optical system 50D according to a fourth modification.

Hereinafter, the first to fourth modifications of the interference optical system 50 will be described. In the following description, differences from the interference optical system 50 will be mainly described, and a description of the same matters will be omitted. In FIGS. 12 to 15, the same components as those in FIG. 2 are denoted by the same reference signs. In FIGS. 12 to 15, a part of the optical elements are not shown.

The interference optical system 50A according to the first modification shown in FIG. 12 is the same as the interference optical system 50 shown in FIG. 2 except that light incident on the photodetector 10, the optical modulator 12, and the object 14 is different. Specifically, in the interference optical system 50A shown in FIG. 12, the emission light L1 (laser light) is incident on the photodetector 10 and the optical modulator 12. The optical modulator 12 shown in FIG. 12 modulates the emission light L1 to generate the reference light L2 including a modulation signal. Subsequently, the reference light L2 is incident on the object 14. Then, the reference light L2 is reflected by the object 14 to generate the object light L3 including the modulation signal and the sample signal, and the object light L3 is incident on the photodetector 10.

The interference optical system 50B according to the second modification shown in FIG. 13 is the same as the interference optical system 50A shown in FIG. 12 except that the arrangement of the photodetector 10, the optical modulator 12, and the object 14 is different.

A laser interferometer including the above-described interference optical systems 50A and 50B according to the first and second modifications includes the laser light source 2, the optical modulator 12, the photodetector 10, and a demodulation circuit and an oscillation circuit, which are not shown in FIGS. 12 and 13. The laser light source 2 emits the emission light L1. The optical modulator 12 modulates the emission light L1 using a vibrator, and generates the reference light L2 including a modulation signal. Subsequently, the reference light L2 is incident on the object 14. Then, the object light L3 including the modulation signal and the sample signal derived from the object 14 and the emission light L1 are incident on the photodetector 10. Therefore, the photodetectors 10 shown in FIGS. 12 and 13 receive the laser light including the sample signal derived from the object 14 and the modulation signal. The demodulation circuit demodulates the sample signal from the light reception signal based on the reference signal. The oscillation circuit operates using the vibrator as a signal source, and outputs the reference signal to the demodulation circuit.

According to such a configuration, the same effects as those of the above-described embodiment can be obtained. That is, it is possible to implement the optical modulator 12 that enables a frequency shift without using a diffraction grating. As a result, a degree of difficulty in manufacturing the optical modulator 12 can be reduced, and cost of the laser interferometer can be reduced. In addition, it is possible to obtain a laser interferometer having high measurement accuracy and excellent resistance to disturbance.

The interference optical system 50C according to the third modification shown in FIG. 14 is the same as the interference optical system 50A shown in FIG. 12, except that the arrangement of the optical modulator 12 and the object 14 is different, and that light incident on the photodetector 10, the optical modulator 12, and the object 14 is different. Specifically, in the interference optical system 50C shown in FIG. 14, the emission light L1 (the laser light) is incident on the photodetector 10 and the object 14. The emission light L1 is reflected by the object 14 to generate the object light L3. Subsequently, the object light L3 is incident on the optical modulator 12. Then, the object light L3 is reflected by the optical modulator 12 to generate the reference light L2 including the modulation signal and the sample signal, and the reference light L2 is incident on the photodetector 10.

The interference optical system 50D according to the fourth modification shown in FIG. 15 is the same as the interference optical system 50C shown in FIG. 14 except that the arrangement of the photodetector 10, the optical modulator 12, and the object 14 is different.

A laser interferometer including the above-described interference optical systems 50C and 50D according to the third and fourth modifications includes the laser light source 2, the optical modulator 12, the photodetector 10, and a demodulation circuit and an oscillation circuit, which are not shown in FIGS. 14 and 15. The laser light source 2 emits the emission light L1. The emission light L1 is incident on the object 14, and the object light L3 including the sample signal is generated. The optical modulator 12 modulates the object light L3 using the vibrator, and generates the reference light L2 including the modulation signal. Then, the reference light L2 including the sample signal derived from the object 14 and the modulation signal and the emission light L1 are incident on the photodetector 10. Therefore, the photodetectors 10 shown in FIGS. 14 and 15 receive the laser light including the sample signal derived from the object 14 and the modulation signal. The demodulation circuit demodulates the sample signal from the light reception signal based on the reference signal. The oscillation circuit operates using the vibrator as a signal source, and outputs the reference signal to the demodulation circuit.

According to such a configuration, the same effects as those of the above-described embodiment can be obtained. That is, it is possible to implement the optical modulator 12 that enables a frequency shift without using a diffraction grating. As a result, a degree of difficulty in manufacturing the optical modulator 12 can be reduced, and cost of the laser interferometer can be reduced. In addition, it is possible to obtain a laser interferometer having high measurement accuracy and excellent resistance to disturbance.

4. Effects of Embodiment

As described above, the laser interferometer 1 according to the embodiment includes the laser light source 2, the optical modulator 12, the photodetector 10, the demodulation circuit 52, and the oscillation circuit 54. The laser light source 2 emits laser light toward the object 14. The optical modulator 12 includes the vibrator 30 to which the laser light is emitted, modulates the laser light using the vibrator 30, and superimposes a modulation signal on the laser light. The photodetector 10 receives the laser light including the sample signal derived from the object 14 and the modulation signal, and outputs the light reception signal. The demodulation circuit 52 demodulates the sample signal from the light reception signal based on the reference signal Ss. The oscillation circuit 54 operates using the vibrator 30 as a signal source, and outputs the reference signal Ss to the demodulation circuit 52.

Further, the vibrator 30 includes the vibration substrate including the base portion 301 and the first vibration arm 302 and the second vibration arm 303 which are vibration units coupled to the base portion 301. The first vibration arm 302 and the second vibration arm 303 vibrate along an in-plane direction of the vibration substrate. In addition, the first vibration arm 302 and the second vibration 303 arm include side surfaces intersecting the in-plane direction described above, and the side surfaces are irradiated with the laser light.

According to such a configuration, the in-plane vibration of the vibrator 30 can be used for the frequency shift of the emission light L1, and the interaction between the vibration of the vibrator 30 and the frequency of the emission light L1 can be increased. Accordingly, it is possible to implement the optical modulator 12 that enables a frequency shift of the emission light L1 without using a diffraction grating which is necessary for an optical modulator in the related art. As a result, a degree of difficulty in manufacturing the optical modulator 12 can be reduced, and cost of the laser interferometer 1 can be reduced.

Further, the in-plane flexural vibration of the vibrator 30 has a larger vibration displacement than that of the thickness-shear vibration. Therefore, the phase shift B of the modulation signal can be easily increased by utilizing the in-plane flexural vibration. Accordingly, an S/N ratio of the light reception signal can be increased, and finally, the laser interferometer 1 having high measurement accuracy such as a displacement and a speed and excellent resistance to disturbance can be implemented.

Further, the in-plane flexural vibration has a lower resonance frequency (a natural frequency) than that of the thickness-shear vibration. Therefore, the frequency of the modulation signal or the reference signal Ss can be reduced. As a result, the number of sampling bits of an analog-to-digital converter (ADC) that processes the modulation signal and the reference signal Ss and a requirement for processing performance of a processor such as a CPU and an FPGA can be reduced. As a result, cost of the laser interferometer 1 can be easily reduced.

Since the vibrator 30 serves as a signal source of the oscillation circuit 54, a temperature characteristic of the modulation signal and a temperature characteristic of the reference signal Ss can be made to correspond to a temperature characteristic of the vibrator 30. Since both the modulation signal and the reference signal Ss are processed in real time by the demodulation circuit 52, a behavior of fluctuation of the modulation signal accompanying a temperature change and a behavior of fluctuation of the reference signal Ss accompanying the temperature change coincide with or approximate to each other. Therefore, even when the temperature of the vibrator 30 changes, the influence on the demodulation accuracy can be prevented, and the demodulation accuracy of the sample signal derived from the object 14 can be improved. Accordingly, the laser interferometer 1 having excellent resistance to the disturbance can be implemented.

In addition, the first vibration arm 302 and the second vibration arm 303 which are vibration units may have a metal film provided on the side surface irradiated with the laser light.

The metal film has a high reflectance of the emission light L1. Therefore, it is possible to prevent loss caused by reflection of the emission light L1 and to increase an S/N ratio of the light reception signal.

In the above-described embodiment, the vibration unit includes the first vibration arm 302 and the second vibration arm 303 arranged in the in-plane direction of the vibration substrate included in the vibrator 30. The first vibration arm 302 and the second vibration arm 303 perform flexural vibration along the in-plane direction.

Such a tuning fork type quartz crystal vibrator is easily available because a manufacturing technique is established, and oscillation is also stable. Therefore, the tuning fork type quartz crystal vibrator is suitable as the vibrator 30.

When the vibration substrate is a quartz crystal substrate, the light reflecting surface 306 which is a side surface irradiated with the laser light may be a surface on the minus side of the X axis of the quartz crystal and may be a wet etching surface.

Such a light reflecting surface 306 is a surface excellent in flatness and angle accuracy due to the anisotropy of the etching rate depending on a crystal orientation of the quartz crystal. Therefore, reflection loss of the emission light L1 incident on the light reflecting surface 306 can be reduced, and optical axis deviation of the emission light L1 and the reference light L2 can be prevented. As a result, the S/N ratio of the light reception signal can be further increased.

When the vibration substrate is a quartz crystal substrate, the light reflecting surface 306 which is a side surface irradiated with the laser light may be a dry etching surface.

During the dry etching, since the anisotropy of the etching rate due to the crystal orientation of the quartz crystal is small, the side surface is cut out at an intended angle and accuracy. Therefore, when the light reflecting surface 306 is a dry etching surface, the reflection loss of the emission light L1 incident on the light reflecting surface 306 can be reduced, and the optical axis deviation of the emission light L1 and the reference light L2 can be prevented.

It is preferable that the optical modulator 12 includes the container 70 (the housing) having an accommodating portion that accommodates the vibrator 30. The accommodating portion is preferably depressurized.

Accordingly, it is possible to reduce air resistance in the in-plane flexural vibration of the vibrator 30. Therefore, it is possible to increase vibration efficiency of the vibrator 30 accommodated in the accommodating portion and to stabilize the vibration. As a result, an S/N ratio of a modulation signal can be further increased.

It is preferable that the container 70 (the housing) has the transmission window 74 which is provided between the laser light source 2 and the light reflecting surface 306 which is a side surface irradiated with the laser light and through which the laser light is transmitted.

Accordingly, in the container 70, a material of the container body 72 other than the transmission window 74 can be freely selected with emphasis on airtightness, insulating properties, and the like. Therefore, the optical modulator 12 having further excellent long-term reliability can be implemented.

It is preferable that a surface of the transmission window 74 has a curved surface shape. Accordingly, the transmission window 74 can be provided with not only a function of transmitting the emission light L1 and the reference light L2 but also a function of adjusting traveling directions of the emission light L1 and the reference light L2. Accordingly, a range in which the laser light is incident on the light reflecting surface 306 can be narrowed, a size of the interference optical system 50 can be reduced, and the function of the collimator lens 3 can be replaced by the transmission window 74, thereby reducing the number of components of the interference optical system 50.

In addition, it is preferable that the transmission window 74 has the incident surface 711 inclined with respect to the incident direction of the emission light L1 (the incident laser light).

According to such a configuration, even when the emission light L1 is reflected by the incident surface 711 of the transmission window 74 and the reflected light L4 is generated, it is possible to reduce probability that the reflected light L4 is incident on the photodetector 10 or the laser light source 2. When the reflected light L4 is incident on the photodetector 10, the reflected light L4 causes a decrease in an S/N ratio of a light reception signal. When the reflected light L4 is incident on the laser light source 2, laser oscillation in the laser light source 2 may be unstable. Therefore, by using the transmission window 74 provided in an inclined posture, it is possible to prevent the decrease in the S/N ratio of the light reception signal and to prevent instability of the laser oscillation.

It is preferable that the vibrator 30 is a silicon vibrator or a ceramic vibrator.

These vibrators are vibrators using a resonance phenomenon, and thus have a high Q value and can easily have a stabilized natural frequency. Accordingly, an S/N ratio of a modulation signal can be increased, and accuracy of the reference signal Ss can be improved. Accordingly, a sample signal derived from the object 14 can be demodulated at a high S/N ratio. The laser interferometer 1 capable of measuring the speed and the displacement of the object 14 with higher accuracy can be implemented.

Although a laser interferometer according to the present disclosure is described above based on the shown embodiment and modifications, the laser interferometer according to the present disclosure is not limited to the above-described embodiment and the modifications. A configuration of each part can be replaced with a configuration having the same function. Further, any other components may be added to the laser interferometer according to the above-described embodiment and the modifications.

The laser interferometer according to the present disclosure can also be applied to, for example, a vibration meter, a clinometer, and a distance meter (a length-measuring device), in addition to the displacement meter and the speedometer described above. Examples of application of the laser interferometer according to the present disclosure include an optical comb interference measurement technique that enables distance measurement, 3D imaging, spectroscopy, and the like, and an optical fiber gyro that implements an angular velocity sensor, an angular acceleration sensor, and the like.

Two or more of the laser light source, the optical modulator, and the photodetector may be mounted on the same substrate. Accordingly, a size and a weight of the optical system can be easily reduced, and ease of assembly of the optical system can be enhanced.

Further, although a so-called Michelson interference optical system is provided in the embodiment and modifications described above, the laser interferometer according to the present disclosure can also be applied as one having an interference optical system of another type such as a Mach-Zehnder interference optical system.

What is claimed is:

1. A laser interferometer comprising:
a laser light source configured to emit laser light toward an object;
an optical modulator including a vibrator configured to modulate the laser light using the vibrator and superimpose a modulation signal on the laser light;
a photodetector configured to receive the laser light including a sample signal derived from the object and the modulation signal, and to output a light reception signal;
a demodulation circuit configured to demodulate the sample signal from the light reception signal based on a reference signal; and
an oscillation circuit configured to operate using the vibrator as a signal source and output the reference signal to the demodulation circuit, wherein
the vibrator includes a vibration substrate having a base portion and a vibration unit coupled to the base portion,
the vibration unit vibrates along an in-plane direction of the vibration substrate,
the vibration unit includes a side surface intersecting with the in-plane direction, and
the side surface is irradiated with the laser light.

2. The laser interferometer according to claim 1, wherein the vibration unit includes a metal film provided on the side surface irradiated with the laser light.

3. The laser interferometer according to claim 1, wherein the vibration unit includes a first vibration arm and a second vibration arm arranged in the in-plane direction, and
the first vibration arm and the second vibration arm perform flexural vibration along the in-plane direction.

4. The laser interferometer according to claim 1, wherein the vibration substrate is a quartz crystal substrate, and
the side surface irradiated with the laser light is a surface on a minus side of an X axis of a quartz crystal and is a wet etching surface.

5. The laser interferometer according to claim 1, wherein the vibration substrate is a quartz crystal substrate, and
the side surface irradiated with the laser light is a dry etching surface.

6. The laser interferometer according to claim 1, wherein the optical modulator includes a housing having an accommodating portion configured to accommodate the vibrator, and
the accommodating portion is depressurized.

7. The laser interferometer according to claim 6, wherein the housing has a transmission window which is provided between the side surface irradiated with the laser light and the laser light source and through which the laser light is transmitted.

8. The laser interferometer according to claim 7, wherein a surface of the transmission window has a curved surface shape.

9. The laser interferometer according to claim 7, wherein the transmission window has an incident surface inclined with respect to an incident direction of the incident laser light.

10. The laser interferometer according to claim 1, wherein the vibrator is a silicon vibrator or a ceramic vibrator.

* * * * *